(12) United States Patent
Blunden et al.

(10) Patent No.: US 10,843,237 B2
(45) Date of Patent: Nov. 24, 2020

(54) DRAIN PIPE CLEANING DEVICE AND METHOD OF CLEANING

(71) Applicant: DYTEQTA LIMITED, Hove (GB)

(72) Inventors: James Blunden, Hove (GB); Charles Hartley, Hove (GB)

(73) Assignee: Dyteqta International Limited, Douglas (GB)

( * ) Notice: Subject to any disclaimer, the term of this patent is extended or adjusted under 35 U.S.C. 154(b) by 42 days.

(21) Appl. No.: 15/851,158

(22) Filed: Dec. 21, 2017

(65) Prior Publication Data

US 2018/0111174 A1    Apr. 26, 2018

Related U.S. Application Data

(63) Continuation-in-part of application No. PCT/IB2016/000881, filed on Jun. 24, 2016, which is a continuation of application No. PCT/IB2015/001065, filed on Jun. 26, 2015.

(51) Int. Cl.
| | | |
|---|---|---|
| *B08B 9/032* | (2006.01) | |
| *E03F 9/00* | (2006.01) | |
| *F16K 3/02* | (2006.01) | |
| *F16K 3/34* | (2006.01) | |

(52) U.S. Cl.
CPC .......... *B08B 9/0325* (2013.01); *B08B 9/0321* (2013.01); *B08B 9/0326* (2013.01); *E03F 9/00* (2013.01); *E03F 9/007* (2013.01); *F16K 3/0281* (2013.01); *F16K 3/34* (2013.01)

(58) Field of Classification Search
CPC ..... B08B 9/027; B08B 9/0321; B08B 9/0323; B08B 9/0326; E03F 9/007; F16K 3/0281; Y10T 137/4857
USPC ........................................................ 137/266
See application file for complete search history.

(56) References Cited

U.S. PATENT DOCUMENTS

| | | | | |
|---|---|---|---|---|
| 2,371,188 A | * | 3/1945 | Russell ................. | B08B 9/0323 137/207.5 |
| 5,730,333 A | * | 3/1998 | Baluk ....................... | A47F 1/03 222/181.3 |
| 2008/0271814 A1 | * | 11/2008 | Wilton ..................... | A62C 4/00 141/285 |

FOREIGN PATENT DOCUMENTS

| | | |
|---|---|---|
| EP | 0246562 A2 | 11/1987 |
| EP | 1279774 A1 | 1/2003 |
| EP | 1529889 A1 | 5/2005 |
| EP | 2108752 A2 | 10/2009 |
| WO | 00/06844 A1 | 2/2000 |
| WO | 2008/032224 A2 | 3/2008 |
| WO | 2014/172310 A1 | 10/2014 |

OTHER PUBLICATIONS

International Search Report from Corresponding PCT/IB2016/000881 dated Oct. 18, 2016 (5 pages).

\* cited by examiner

*Primary Examiner* — Marc Lorenzi

(74) *Attorney, Agent, or Firm* — Hovey Williams LLP

(57) ABSTRACT

The invention relates to a device and a method for cleaning a drain pipe or a pipe connected thereto, by ensuring the formation of successive distinct water waves flowing in the pipe, with or without additive(s).

11 Claims, 6 Drawing Sheets

DRAIN PIPE CLEANING DEVICE AND METHOD OF CLEANING

The present application is a continuation in part of PCT/IB2016/000881 filed on Jun. 24, 2016, published on Dec. 29, 2016 under number WO2016/207716, and claiming the priority of PCT/IB2015/001065 filed on Jun. 26, 2015.

ABSTRACT OF THE DISCLOSURE

The invention relates to a device and a method for cleaning a drain pipe or a pipe connected thereto, by ensuring the formation of successive distinct water waves flowing in the pipe, with or without additive(s).

THE STATE OF THE ART

Drain pipes of buildings are nowadays more and more problematic, as being sources of infections, contamination, health problems, etc.

Drain pipe installed in a building is for conducting waste water from kitchen and/or sanitary appliances, such as toilets, wash basins, bathtubs, etc. into the sewer usually located in the underground of the building. In the case of a multi-story building, the drainage system comprises a substantially vertical stack extending through the floor of each story and branch pipes for conducting the waste water from each sanitary appliance present on each floor.

For detecting deficiencies in drain pipes, WO2008/032224 discloses a specific equipment comprising essentially an air transient generator and a pressure transducer.

With the advent of low flush volume toilets and urinals, the proper flushing and purging of the drainage pipe has become a major concern, due to various deposits.

WO2014/172310 discloses a device suitable for ensuring periodic heavier flush volume introduced into the toilets or urinals, the flush coming directly from the water supply. Such a device is not suitable for removing important deposit in drain pipes, and is water consuming.

Up to now there is no efficient system for ensuring a drain pipe cleaning using when required a low amount of treatment medium, such as water with or without additives.

BRIEF DESCRIPTION OF THE INVENTION

The present invention relates to a device for cleaning a drain pipe or a pipe connected thereto in order to break down or reduce at least one blockage present in the drain pipe or a pipe connected thereto by at least two successive waves of liquid escaping at least the device according to a laminar flow, said device comprising at least:
- a reservoir comprising distinct separate compartments, the said reservoir having at least one connecting part adapted for connecting it to a water supply, said connecting part can be associated with non return means, whereby each distinct compartment is provided with a distinct outlet opening;
- an outlet (10) adapted to be connected to pipe selected from the group including the drain pipe and a pipe connected to the drain pipe, said outlet (10) being associated with a knife valve actuated by actuating mechanism (8) between a fully closed position and a fully open position;
- a duct comprising several distinct channels (11A, 11B, 11C) extending each between the outlet opening of a compartment of the reservoir and an outlet opening of the channel considered adjacent to the outlet (10) of the device, said duct comprising a curved portion of 45° to about 90° so as to enable at least a gravity flow of liquid from a compartment of the reservoir towards the outlet 10 of the device when the valve is in open position;
- whereby the knife valve KV actuated by the valve mechanism is adapted to move from a fully closed position in which the knife valve closes the outlet openings of the various channels of the duct, up to a fully open position in which the said outlet openings of the various channels of the duct are not closed by the knife valve, with intermediate positions for which one or more outlet openings of one or more channels are not closed by the knife valve, while one or more outlet openings of one or more other channels are closed by the knife valve;
- in which the different channels are provided adjacent to their outlet opening with a honeycomb structure adapted for generating a laminar flow for the water flowing through said outlet opening when not closed by the knife valve.

With the device of the present invention, it is possible to control the volume of water of the different flushing waves, by displacing the valve so as to ensure timely delayed flow of water from the different compartments. The device of the invention also makes it possible to control the volume of the flush waves, as well as the time elapsing between two successive waves and/or the different possible additive(s) used for the different waves.

The controlled flushing mechanism can have a valve actuating system controlled by an electro-mechanical system. The electro-mechanical system is adapted to release staggered flushes in the pipe to be cleaned, to achieve good (preferably excellent or near maximum) drain line carry, blockage breakdown and build-up reduction The device of the invention can be quite compact and can be operated manually and/or automatically, for example at regular and/or specified moments or after detection of a possible problem.

By having several distinct compartments with distinct channels ensuring a laminar flow of medium into the pipe to be cleaned or treated, with the opening of said channels being controlled by a same gate or knife valve, it is possible to ensure or control successive waves. Moreover, by flushing together water from two compartments, it is possible to ensure if required successive waves having different flushing volume, for example a higher final flushing volume and a lower initial flushing volume (such as with a high concentration of one or more additives).

Details and advantageous characteristics of embodiments of the device of the invention are one or more of the following:
- the different channels are provided adjacent to their outlet opening with a honeycomb structure adapted for generating a laminar flow for the water flowing through said outlet opening when not closed by the knife valve, said honeycomb structure being distant from said outlet opening by a distance of at least 0.5 cm, or at least 1 cm, or from 1 to 5 cm.
- one or more compartments of the reservoir is/are each associated with a dosing system for adding one additive to the water present in the compartment considered.
- the duct has a substantial linear portion adjacent to the outlet opening of the device, said linear portion having a length of at least 5 cm, or at least 10 cm, whereby the honeycomb structure extends at least partly within the said substantial linear portion.
- the honeycomb structure extends on a length of at least 20 cm within the distinct channels of the duct.

the device is associated with an air admittance valve, and can be adjacent to the knife valve.

the duct comprises at least three distinct channels separated the one from the other by a wall, which can be a curved wall.

the wall separating two adjacent channels of a duct having a substantially circular cross section has a radius of curvature at least equal to the radius of substantially circular cross section.

the reservoir comprises at least three distinct compartments, each of said three compartments being connected respectively to a first, second, and third distinct channel extending within a common duct, whereby the knife valve actuated by the valve control mechanism is adapted to control the displacement of said knife valve so as to control the opening of the first channel, while maintaining closed the second and third channels, then opening the first and second channels, before controlling the opening of the three channels.

the reservoir comprises at least four distinct compartments, each of said four compartments being connected respectively to a first, second, third and fourth distinct channel extending each within a common duct, whereby the knife valve actuated by the valve control mechanism is adapted to control the displacement of said knife valve so as to control the opening of the first channel, while maintaining closed the second, third and fourth channels, then opening the first and second channels, while maintaining closed the third and fourth channels, thereafter opening the first, second and third channels before controlling the opening of the four channels together.

at least two distinct channels have a different volume.

the knife valve is moving in a linear direction and has a circular edge end having substantially the radius of curvature corresponding to the radius of the duct.

the valve control mechanism comprises an actuating means provided with a receiving means of a signal emitted by a detecting device adapted for detecting a blockage in the drain pipe and a pipe connected to the drain pipe, which detecting device can be a sonar detecting device.

each distinct compartment of the tank with its channel has a total flushing volume of less than 1 litre, or of less than 0.5 litre.

the tank is connected to an air vent.

the distinct channels of the duct are stacked the one above the other, whereby the base of one compartment forms a ceiling of another compartment.

combinations of two or more of said details and characteristics.

The invention relates also to a method for cleaning a drain pipe or a pipe connected thereto in order to break down or reduce at least one blockage present in the drain pipe or a pipe connected thereto, said method comprising the steps of:

detecting a problem relating to a blockage in the drain pipe or a pipe connected thereto, sending water, possibly with one or more additives, in the drain pipe or pipe connected thereto, in the form of successive distinct water waves, each of said waves having a volume of less than 1 litre, or of less than 0.5 litre; and detecting whether the problem relating to a blockage is solved or reduced.

The step of sending water, possibly with one or more additives, in the drain pipe or pipe connected thereto, in the form of successive distinct water waves, can be operated by a device of the invention.

In case after treating the drain pipe or pipe connected thereto with a predetermined series of successive distinct water waves, a problem in the treated drain pipe or pipe connected thereto is still detected, an alarm signal can be emitted.

In the method of the invention, the pipe is treated with water possibly added with one or more additives, in the required concentration. Such additives are for example degreasing agents, enzyme, pipe coating agents, lubricants, perfumes, thickening agents (for controlling the viscosity and/or speed of the wave flowing within the pipe), chemicals (sodium hydroxide, surfactants, etc.), anti adherence agents, and combinations thereof.

Details of an embodiment will appear from the following description in which reference is made to the attached drawings.

BRIEF DESCRIPTION OF THE DRAWINGS

FIG. 2 is a schematic cross section view of a device of the invention with the knife valve in fully open position, while

DESCRIPTION OF A PREFERRED EMBODIMENT

Figure 1:
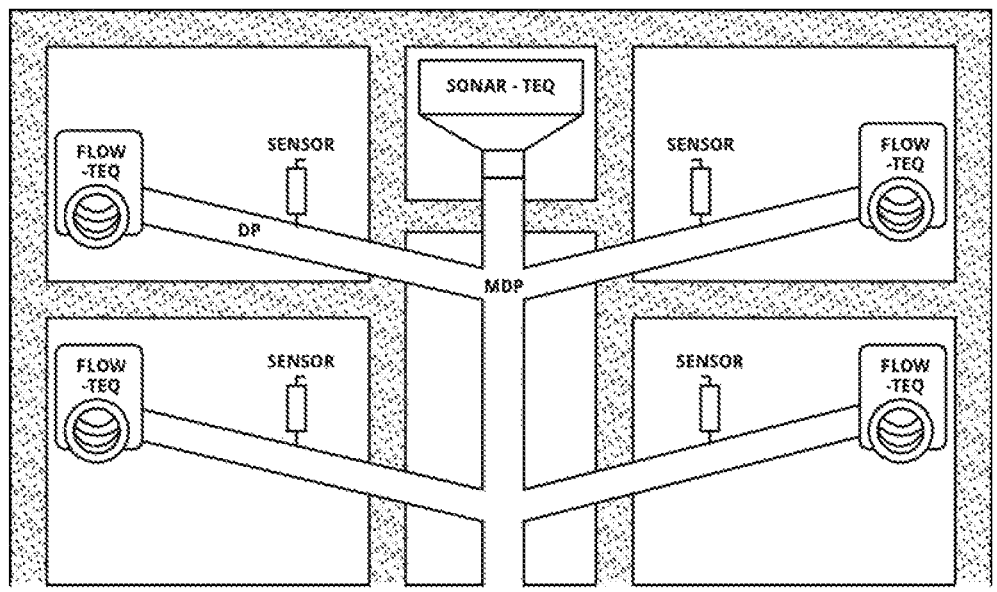
FIG. 1 is a schematic view of drain pipe associated with a sonar detection system for blockages and with cleaning devices.

FIG. 1 shows a vertical main drain pipe MDP of a building, said main drain pipe being connected discharge pipes DP conducting waste water from kitchen and/or sanitary appliances, such as toilets, wash basins, bathtubs, etc. into the sewer usually located in the underground of the building. Each discharge pipe is associated with a sensor cooperating with a sonar equipment (Sonar-Teq™) for determining the presence and location of blockages. Each discharge pipe DP is associated with a device Flow-Teq™ for introducing a treating liquid for treating the detected blockage, said device comprising at least:

a reservoir R comprising distinct separate compartments (four in the embodiment represented in FIG. 1, the number of distinct compartments can be from 3 up to 10, but can be from 4 to 7), the said reservoir R having at least one connecting part adapted for connecting it to a water supply WS, said connecting part can be associated with non return means 7, whereby each distinct compartment C1, C2, C3, C4 is provided with a distinct outlet opening. In the reservoir R, the compartments are separated the one from the other by separating walls SW extending below the cover of the reservoir, whereby creating an upper volume connecting the reservoir the one to the other, for example in case of overflow. The anti return system 7 can be provided with a means for stopping the supply of water from the water supply WS when a specific water level of water is reached in one or more compartments of the reservoir R. Each compartment can be associated with at least one dosing device 5 which can be connected to a removable canister containing the additive to be furnished in the water of the compartment considered.

an outlet (10) adapted to be connected to pipe selected from the group including the drain pipe and a pipe connected to the drain pipe, said outlet (10) being associated with a knife valve KV actuated by actuating mechanism (8), such as an electro-mechanical mechanism, between a fully closed position and a fully open position. The knife valve KV has lateral edges sliding in substantially parallel grooves G. The movement of the valve KV can be for example, substantially vertical (arrow V), whereby the valve can return in its fully closed position only by the action of gravity. Possibly the lifting of the valve away from its closed position can be operated against the action of a return mechanism, such as a spring. The free downwards end KV1 of the valve KV is provided with a semi-circular portion adapted to ensure the closing of all channels, as well as the closing of only some channels.

a duct 30 comprising several distinct channels (11A, 11B, 11C, 11D) extending each between the outlet opening of one distinct compartment (C1, C2, C3, C4) of the reservoir and an outlet opening (11A1, 11B1, 11C1, 11D1) of the channel considered adjacent to the outlet (10) of the device, said duct 30 comprising a curved portion 30C of about 90° so as to enable at least a gravity flow of liquid from a compartment of the reservoir towards the outlet 10 of the device when the valve is in open position for the channel of the compartment considered.

Figure 2:
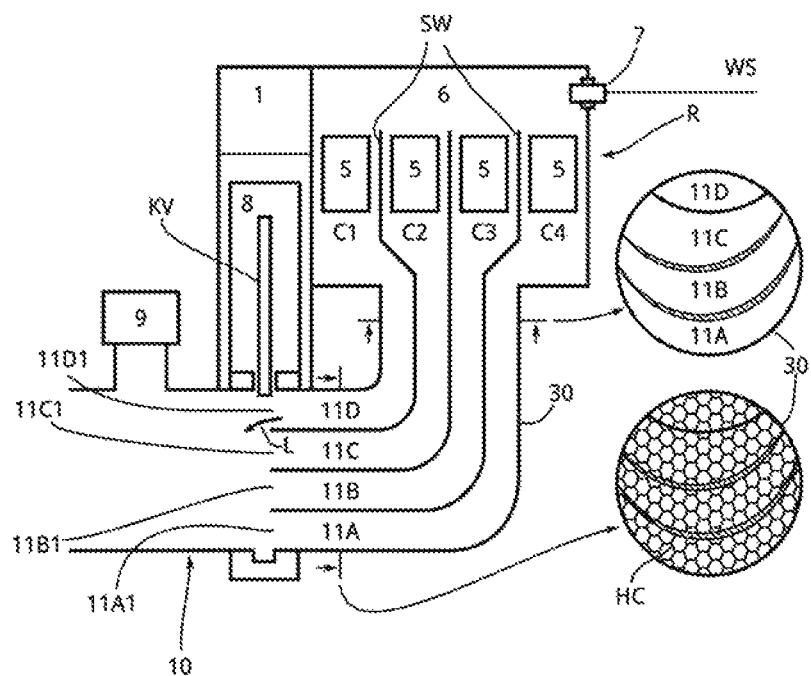
Figure 3:
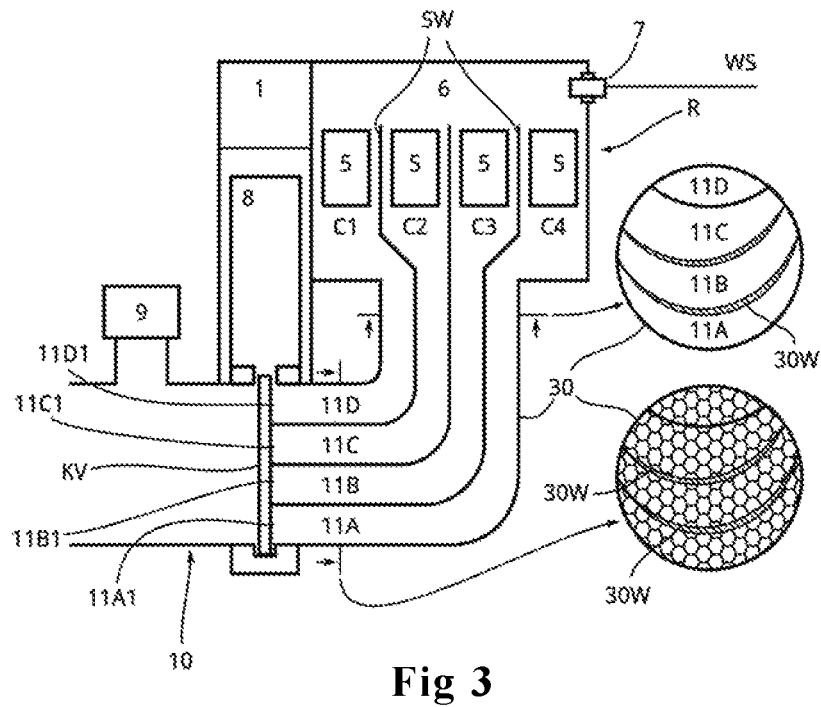
FIGS. 3 to 6 are views similar to FIG. 2 with different position of the knife valve.
Figure 4:
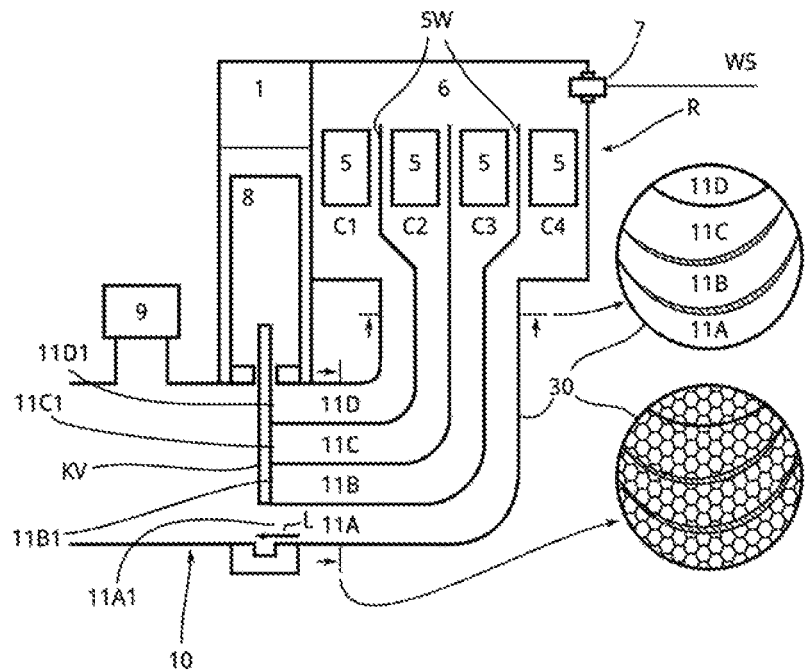
Figure 5:
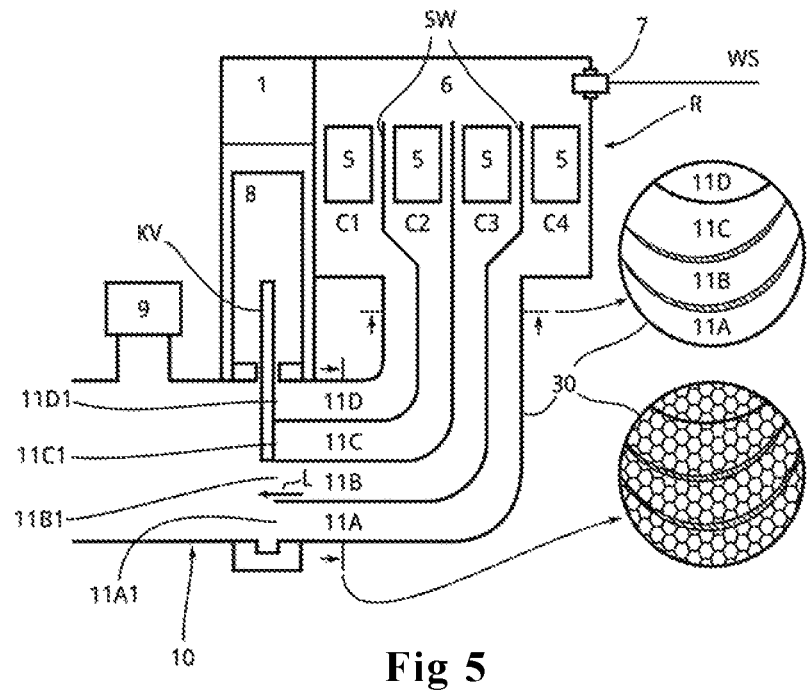
Figure 6:
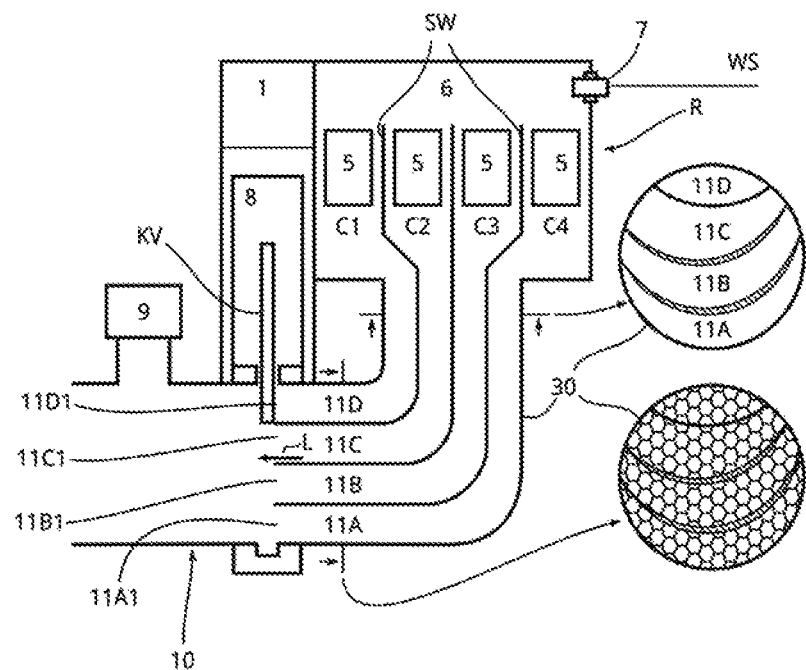

The knife valve KV actuated by the valve mechanism is adapted to move from a fully closed position in which the knife valve closes the outlet openings (11A1, 11B1, 11C1, 11D1) of the various channels of the duct 30 (see FIG. 3—the knife valve is in down position), up to a fully open position (see FIG. 2) in which the said outlet openings of the various channels of the duct are not closed by the knife valve KV, with intermediate positions (shown in FIGS. 4 to 6) for which one or more outlet openings (11A1,11B1,11C1,11D1) of one or more channels are not closed by the knife valve, while one or more outlet openings of one or more other channels are closed by the knife valve. For example in FIG. 4, the outlet opening 11A1 is not closed, whereby enabling the flow of water and additive present in compartment C4 to flow through the outlet 10 into the discharge pipe DP. In FIG. 5, the knife valve is lifted so that the openings 11A1 and 11B1 are not closed, whereby enabling water from compartment C3 to flow out through the outlet 10, and can be a time after the end of compartment C4 is emptied. In FIG. 6, the knife valve is further lifted, after the compartment C3 is emptied, so as to open the opening 11C1, whereby enabling the liquid present in the compartment C2 to flow out of the device.

In order to ensure a laminar flow for the liquid escaping the device through the outlet 10, the different channels are provided adjacent to their outlet opening (11A1, 11B1, . . . ) with a honeycomb structure HS adapted for generating a laminar flow for the water flowing through said outlet opening (11A1, 11B1, . . . ) when not closed by the knife valve. Said honeycomb structure extends partly in the axial/linear portion of the duct 30 adjacent to the outlet 10 and partly in the curved portion of the duct 30. If required, the honeycomb structure can also extend in the axial portion of the duct between the curved portion 30C and the compartments.

Figure 7:
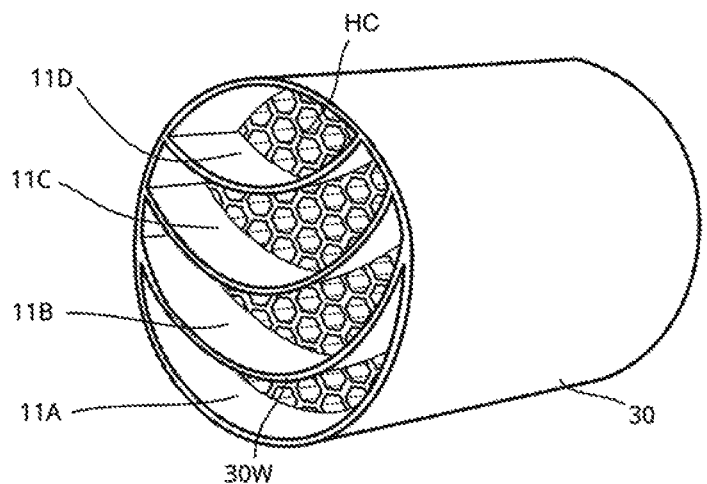
FIG. 7 is a perspective view of the outlet section of the duct.
Figure 8:
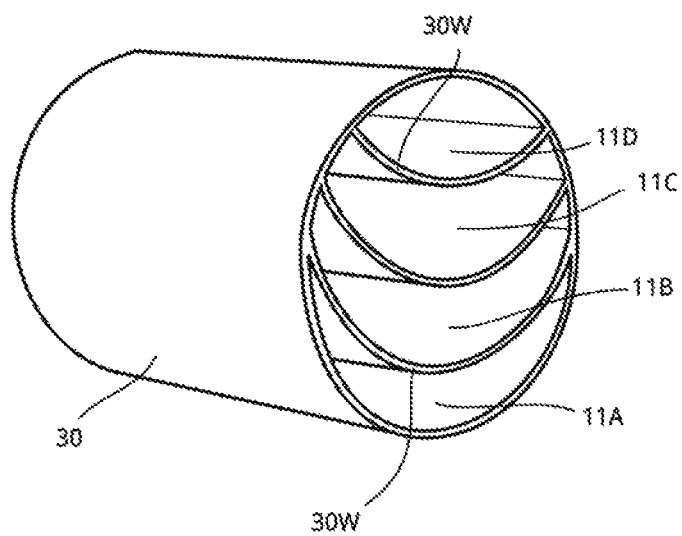
FIG. 8 is a perspective view of the inlet section of the duct.
Figure 9:
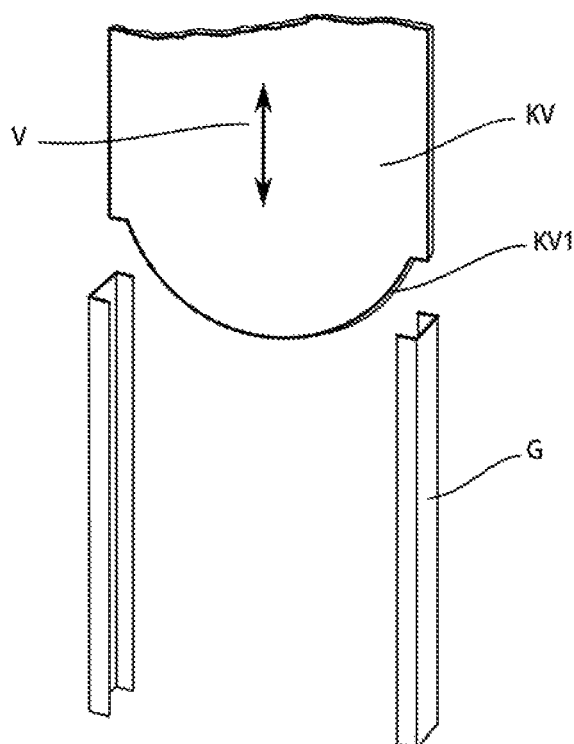
FIG. 9 is a schematic view of the knife valve.
Figure 10:
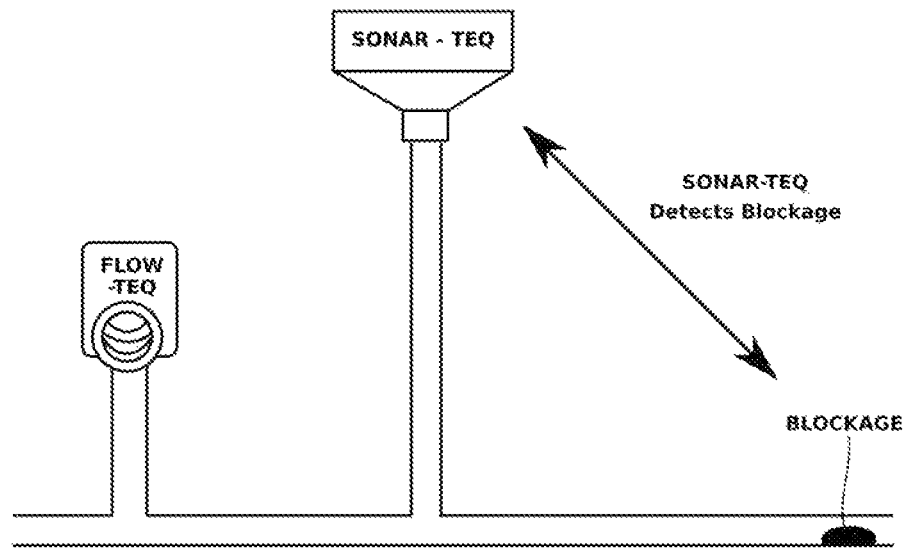
FIGS. 10 to 12 are showing steps of a method of the invention.
Figure 11:
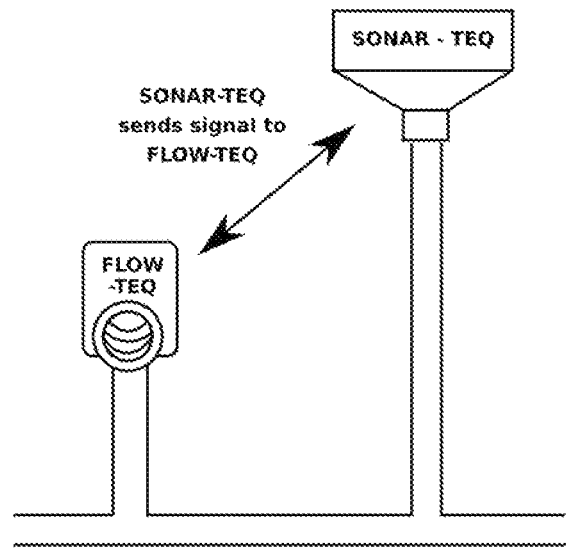
Figure 12:
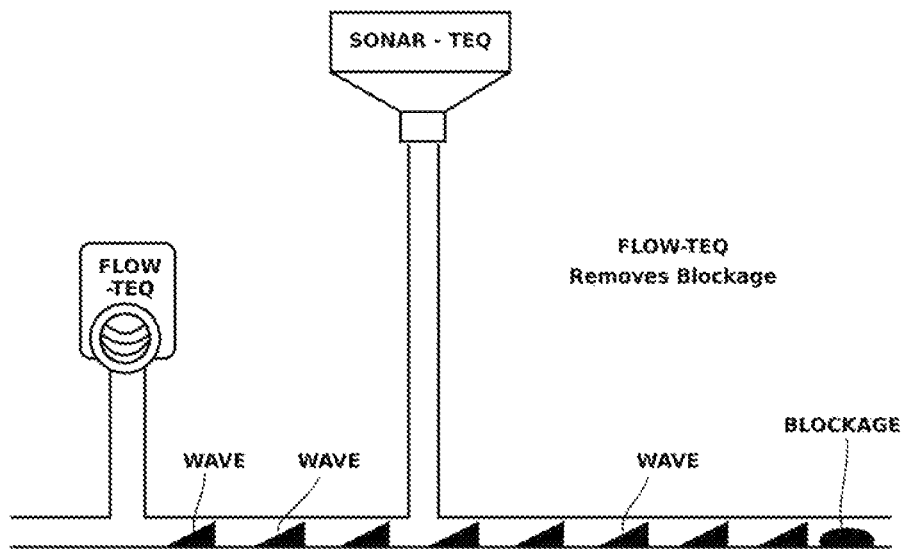

It has been observed that said honeycomb structure can be distant from said outlet opening by a distance of at least 0.5 cm, or of at least 1 cm, or of from 1 to 5 cm. This enables a quick initial high flow of liquid out of the channel when the open section of its opening is increased (see FIG. 7).

The duct has a substantial linear/axial portion adjacent to the outlet opening 10 of the device, said linear portion having a length of at least 5 cm, or of at least 10 cm, whereby the honeycomb structure extends at least partly within the said substantial linear portion.

The honeycomb structure extends on a length of at least 20 cm, such as from 25 to 50 cm within the distinct channels of the duct. According to a possible embodiment, each distinct channel for the liquid coming from a compartment is provided with a series of internal honeycomb channels.

The duct 30 comprises several distinct channels separated the one from the other by an inner wall, which can be an inner curved wall 30W having the shape of a substantially circular portion which has a radius of curvature at least equal to the radius of substantially circular cross section of the duct 30.

The outlet 10 of the device is provided with a connection adapted for an air vent, such as an air admittance valve. The outlet 10 can also be adapted to be connected to a drain pipe provided with an air vent or an air admittance valve.

The lifting of the knife valve can be controlled by an electric motor 1 receiving signals from a computer, for example connected to a sonar detection system such as Sonar-Teq™.

The cleaning of a drain pipe or a discharge pipe connected thereto in order to break down or reduce at least one blockage present in the drain pipe or discharge pipe connected thereto, can be operated as follows:

detecting a problem relating to a blockage in the drain pipe or a pipe connected thereto, such a detection can be operated with a sonar technology, or by any other suitable technologies;

the various devices of the invention (Flow-Teq™) are ready to use or are filled with water when a blockage is detected;

the location and type of blockage is determined, a computer determines then the device of the invention to be used;

command signal is then sent to the device (such as Flow-Teq™) to be used for treating the blockage, said command signal controlling the working of the electric motor for lifting step by step the gate or knife valve for sending water, possibly with one or more additives, in the drain pipe or pipe connected thereto, in the form of successive distinct water waves, each of said waves having a volume of less than 1 litre, or of less than 0.5 litre;

repeating said treatment with water waves, if required; and detecting whether the problem relating to a blockage is solved or reduced after one or more steps of water wave treatment; and in case after treating the drain pipe or pipe connected thereto with a predetermined series of successive distinct water waves, a problem in the treated drain pipe or pipe connected thereto is still detected, an alarm signal is emitted.

From the said description, it appears that subject matter of the invention are among others:

A device adapted to be connected to a drain element selected from the group including drain pipe and discharge pipes connected thereto, for cleaning said drain element by breaking down or reducing at least partly one blockage present in said drain element by generating at least two successive waves of liquid (for example water or an aqueous composition, with one or more additives) escaping from the device according to a laminar flow into said drain element, said device comprising at least:

a reservoir comprising at least a first liquid containing compartment and a second liquid containing compartment distinct and separate from the first liquid containing compartment, the said reservoir having at least one connecting part adapted for connecting it to a liquid supply for the filling of said at least first liquid containing compartment and second liquid containing compartment, whereby said first liquid containing compartment and said second liquid containing compartment are each provided with a distinct outlet opening;

an outlet pipe (10) having an inlet passage and an outlet passage adapted to be connected to the drain element to be cleaned, said outlet pipe being adapted to be located at a level below the reservoir when the device is connected to a drain element;

a knife valve (KV) associated with said outlet pipe (10) adjacent to the inlet passage, said knife valve (KV) being movable between a fully closed position in which liquid from the first liquid containing compartment and from the second liquid containing compartment is prevented from flowing within the outlet pipe (10) through the inlet passage, and a fully open position in which liquid from the first liquid containing compartment and from the second liquid containing compartment can flow within the outlet pipe (10) through the inlet passage;

an actuating mechanism (8) for the knife valve so as to move it between the fully closed position and the fully open position;

a duct (30) extending between the reservoir and the outlet pipe (10), said duct comprising at least a first channel and a second channel distinct and separate from the first channel, whereby the said first channel (11A) extends between the outlet opening of the first compartment and an outlet of the first channel adjacent to the inlet passage of the outlet pipe (10), while the second channel (11B) extends between the outlet opening of the second compartment and an outlet of the second channel adjacent to the inlet passage of the outlet pipe (10), said duct comprising a curved portion of 45° to about 90° so as to enable at least a gravity flow of liquid from a compartment selected from the first liquid containing compartment and the second liquid containing compartment of the reservoir towards the outlet pipe (10) when the knife valve (KV) is in its fully open position;

whereby the knife valve (KV) actuated by the actuating mechanism is adapted to move from a fully closed position in which the knife valve closes the outlet opening of the first channel and the outlet opening of the second channel of the duct, up to a fully open position in which the said outlet opening of the first channel and the said outlet opening of the second channel of the duct are not closed by the knife valve (KV), with at least one intermediate position for which at least one of the outlet opening of the first channel and the outlet opening of the second channel is not closed by the knife valve, while at least one of the outlet opening of the first channel and the outlet opening of the second channel is closed by the knife valve (KV);

in which the first and second channels of the duct are provided adjacent to their outlet opening with a honeycomb structure adapted for generating a laminar flow for the liquid flowing through said outlet opening when not closed by the knife valve.

Said device can have one or more of the following characteristics:

the reservoir comprises a plurality of distinct and separate liquid containing compartments each provided with a distinct outlet opening;

the knife valve (KV) is movable between a fully closed position in which liquid from the plurality of distinct and separate liquid containing compartments is prevented from flowing within the outlet pipe (10) through the inlet passage, and a fully open position in which liquid from plurality of distinct and separate liquid containing compartments can flow within the outlet pipe (10) through the inlet passage;

the duct (30) comprises a plurality of channels, each channel of the said plurality of channels extending between the outlet opening of a compartment of the plurality of distinct and separate liquid containing compartments and an outlet of the said each channel adjacent to the inlet passage of the outlet pipe (10), said duct comprising a curved portion of 45° to about 90° so as to enable at least a gravity flow of liquid from the plurality of compartments of the reservoir towards the outlet pipe (10) when the knife valve (KV) is in its fully open position;

the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with at least one intermediate position for which at least one of the outlet openings of the plurality of channels is not closed by the knife valve, while at least one other of the outlet openings of the plurality of channels is closed by the knife valve (KV);

the plurality of channels of the duct are each provided adjacent to their outlet opening with a honeycomb structure adapted for generating a laminar flow for the liquid flowing through said outlet opening when not closed by the knife valve.

the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with at least one intermediate position for which at least two of the outlet openings of the plurality of channels are not closed by the knife valve, while at least one other of the outlet openings of the plurality of channels is closed by the knife valve (KV).

the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with a plurality of intermediate positions for which at least two of the outlet openings of the plurality of channels are not closed by the knife valve, while at least one other of the outlet openings of the plurality of channels is closed by the knife valve (KV).

the first and second channels are provided adjacent to their outlet opening with a honeycomb structure adapted for generating a laminar flow for the liquid flowing from a channel through said outlet opening when not closed by the knife valve, said honeycomb structure being distant from said outlet opening by a distance of at least 0.5 cm, such as of at least 1 cm, such as from 1 to 5 cm.

at least one of the first and second compartments of the reservoir is associated with a dosing system for adding one additive to the liquid present in the compartment considered.

the duct has a substantial linear portion adjacent to the outlet opening of the first channel and to the outlet opening of the second channel, said linear portion having a length of at least 5 cm, whereby the honeycomb structure extends at least partly within the said substantial linear portion.

the honeycomb structure extends at least in the said linear portion on a length of at least 10 cm within each of the said first channel and second channel.

the duct has a substantial linear portion adjacent to the outlet opening of the first channel and to the outlet opening of the second channel, said linear portion having a length of at least 20 cm, whereby a honeycomb structure extends at least in the said linear portion on a length of at least 20 cm within each of the said first channel and second channel.

the device is associated with an air admittance valve.

the device is associated with an air admittance valve adjacent to the knife valve (KV).

the duct comprises at least three distinct channels separated the one from the other by a wall.

the duct comprises at least three distinct channels separated the one from the other by a curved wall.

the duct has a substantially circular cross section, while the wall separating two adjacent channels of said duct has a radius of curvature at least equal to the radius of substantially circular cross section of the duct.

the reservoir comprises at least three distinct compartments, each of said three compartments being connected respectively to a first, second, and third distinct channel extending within a common duct, whereby the knife valve actuated by the valve control mechanism is adapted to control the displacement of said knife valve between a fully closed position and a fully open position, and a first intermediate position, in which liquid present in the first channel can flow into the outlet pipe (10), while preventing liquid present in the second and third channels from flowing into the outlet pipe (10), and a second intermediate position, in which liquid present in the first and second channels can flow into the outlet pipe (10), while preventing liquid present in the third channel from flowing into the outlet pipe (10).

the reservoir comprises at least four distinct compartments, each of said four compartments being connected respectively to a first, second, third and fourth distinct channel extending each within a common duct, whereby the knife valve actuated by the valve control mechanism is adapted to control the displacement of said knife valve between a fully closed position and a fully open position, and a first intermediate position, in which liquid present in the first channel can flow into the outlet pipe (10), while preventing liquid present in the second, third and fourth channels from flowing into the outlet pipe (10), and a second intermediate position, in which liquid present in the first and second channels can flow into the outlet pipe (10), while preventing liquid present in the third and fourth channels from flowing into the outlet pipe (10), and a third intermediate position, in which liquid present in the first, second and third channels can flow into the outlet pipe (10), while preventing liquid present in the fourth channel from flowing into the outlet pipe (10).

at least the first channel and the second channel have a different volume.

the duct has an end portion adjacent to the knife valve, said end portion having a substantially circular cross section defined by a radius of curvature, while the knife valve (KV) is moving in a linear direction and has an edge end following a section of a circle having a radius corresponding substantially to the radius of curvature of the end portion of the duct adjacent to the knife valve (KV).

the valve control mechanism comprises an actuating means provided with a receiving means of a signal emitted by a detecting device adapted for detecting a blockage in the drain element.

the receiving means is adapted to receive a signal from a sonar detecting device.

the at least first compartment with its channel and second compartment with its channel each have a total flushing volume of less than 1 litre.

the at least first compartment with its channel and second compartment with its channel each have a total flushing volume of less than 0.5 litre.

the reservoir is connected to an air vent.

the distinct channels of the duct are stacked the one above the other with interposition of a wall, whereby said wall forms a base of one channel, while forming a ceiling of another channel.

A device adapted to be connected to a drain element selected from the group including drain pipe and discharge pipes connected thereto, for cleaning said drain element by breaking down or reducing at least partly one blockage present in said drain element by generating at least two successive waves of liquid (for example water or an aqueous composition, with one or more additives) escaping from the device according to a laminar flow into said drain element, said device comprising at least:

a reservoir comprising a plurality of distinct and separate liquid containing compartments each provided with a distinct outlet opening, the said reservoir having at least one connecting part adapted for connecting it to a liquid supply for the filling of said plurality of compartments, whereby said plurality of liquid containing compartments are each provided with a distinct outlet opening;

an outlet pipe (10) having an inlet passage and an outlet passage adapted to be connected to the drain element to be cleaned, said outlet pipe being adapted to be located at a level below the reservoir when the device is connected to a drain element via the outlet pipe (10);

a knife valve (KV) associated with said outlet pipe (10) adjacent to the inlet passage, said knife valve (KV) being movable between a fully closed position in which liquid from the plurality of distinct and separate liquid containing compartments is prevented from flowing within the outlet pipe (10) through the inlet passage, and a fully open position in which liquid from the plurality of distinct and separate liquid containing compartments can flow within the outlet pipe (10) through the inlet passage;

an actuating mechanism (8) for the knife valve so as to move it between the fully closed position and the fully open position;

a duct (30) extending between the reservoir and the outlet pipe (10), said duct comprising a plurality of channels, each channel of the said plurality of channels extending between the outlet opening of a compartment of the plurality of distinct and separate liquid containing compartments and an outlet of the said each channel adjacent to the inlet passage of the outlet pipe (10), said duct comprising a curved portion of 45° to about 90° so as to enable at least a gravity flow of liquid from the plurality of compartments of the reservoir towards the outlet pipe (10) when the knife valve (KV) is in its fully open position;

whereby the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with at least one intermediate position for which at least one of the outlet openings of the plurality of channels is not closed by the knife valve, while at least one other of the outlet openings of the plurality of channels is closed by the knife valve (KV);

in which the plurality of channels of the duct are each provided adjacent to their outlet opening with a honeycomb structure adapted for generating a laminar flow for the liquid (for example water or an aqueous composition, with one or more additives) flowing through said outlet opening when not closed by the knife valve.

Said device can have one or more of the following characteristics:

the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with at least a plurality of intermediate positions for which at least two of the outlet openings of the plurality of channels are not closed by the knife valve, while at least one other of the outlet openings of the plurality of channels is closed by the knife valve (KV).

at least several channels of the plurality of channels are provided adjacent to their outlet opening with a honeycomb structure adapted for generating a laminar flow for the water flowing through said outlet opening when not closed by the knife valve, said honeycomb structure being adjacent to said outlet opening of the channel considered distant from said outlet opening by a distance of at least 0.5 cm.

at least several channels of the plurality of channels are provided adjacent to their outlet opening with a honeycomb structure adapted for generating a laminar flow for the liquid flowing through said outlet opening when not closed by the knife valve, said honeycomb structure being distant from said outlet opening by a distance of at least 0.5 cm, of or at least 1 cm.

at least several channels of the plurality of channels are provided adjacent to their outlet opening with a honeycomb structure adapted for generating a laminar flow for the liquid flowing through said outlet opening when not closed by the knife valve, said honeycomb structure being distant from said outlet opening by a distance of from 1 to 5 cm.

at least several compartments of the reservoir are each associated with a dosing system for adding one additive to the liquid present in the compartment considered.

the duct has a substantial linear portion adjacent to the outlet opening of each of the plurality of channels, said linear portion having a length of at least 5 cm, whereby a honeycomb structure extends at least partly within the said substantial linear portion, said honeycomb structure being adapted for generating a laminar flow for the liquid flowing from one compartment through the outlet opening of its channel when not closed by the knife valve.

the honeycomb structure extends at least in the said linear portion on a length of at least 10 cm within each of the said plurality of channels.

the device is associated with an air admittance valve.

the device is associated with an air admittance valve adjacent to the knife valve (KV).

the duct comprises at least four distinct channels separated the one from the other by a curved wall.

the duct has a substantially circular cross section, while the wall separating two adjacent channels of said duct has a radius of curvature at least equal to the radius of substantially circular cross section of the duct.

A method for cleaning a drain element selected from the group including drain pipe and discharge pipes connected thereto, drain pipe or a pipe connected thereto in order to break down or reduce at least one blockage present in the drain element, said method comprising the steps of:

detecting a problem relating to a blockage in the drain element, sending at least water (for example water or an aqueous composition, with one or more additives) in the drain element in the form of at least two successive distinct waves of water, each of said waves having a volume of less than 1 litre;

detecting whether the problem relating to a blockage is solved or reduced, and in case the problem relating to a blockage is not solved or sufficiently reduced, repeating the step of sending water in the drain element in the form of at least two successive distinct waves of water, each of said waves having a volume of less than 1 litre.

Said method can be a method for cleaning a drain element selected from the group including drain pipe and discharge pipes connected thereto, drain pipe or a pipe connected thereto in order to break down or reduce at least one blockage present in the drain element, said method comprising the steps of:

detecting a problem relating to a blockage in the drain element, sending at least water (for example water or an aqueous composition, with one or more additives) in the drain element in the form of at least two successive distinct waves of water, each of said waves having a volume of less than 1 litre;

detecting whether the problem relating to a blockage is solved or reduced, and in case the problem relating to a blockage is not solved or sufficiently reduced, repeating the step of sending water in the drain element in the form of at least two successive distinct waves of water, each of said waves having a volume of less than 1 litre, in which the step of sending at least water in the drain element in the form of at least two successive distinct water waves, is operated by a device comprising at least:

a reservoir comprising at least a first liquid containing compartment and a second liquid containing compartment distinct and separate from the first liquid containing compartment, the said reservoir having at least one connecting part adapted for connecting it to a liquid supply for the filling of said at least first liquid containing compartment and second liquid containing compartment, whereby said first liquid containing compartment and said second liquid containing compartment are each provided with a distinct outlet opening;

an outlet pipe (10) having an inlet passage and an outlet passage adapted to be connected to the drain element to be cleaned, said outlet pipe being adapted to be located at a level below the reservoir when the device is connected to a drain element;

a knife valve (KV) associated with said outlet pipe (10) adjacent to the inlet passage, said knife valve (KV) being movable between a fully closed position in which liquid from the first liquid containing compartment and from the second liquid containing compartment is prevented from flowing within the outlet pipe (10) through the inlet passage, and a fully open position in which liquid (for example water or an aqueous composition, with one or more additives) from the first liquid containing compartment and from the second liquid containing compartment can flow within the outlet pipe (10) through the inlet passage;

an actuating mechanism (8) for the knife valve so as to move it between the fully closed position and the fully open position;

a duct (30) extending between the reservoir and the outlet pipe (10), said duct comprising at least a first channel and a second channel distinct and separate from the first channel, whereby the said first channel (11A) extends between the outlet opening of the first compartment and an outlet of the first channel adjacent to the inlet passage of the outlet pipe (10), while the second channel (11B) extends between the outlet opening of the second compartment and an outlet of the second channel adjacent to the inlet passage of the outlet pipe (10), said duct comprising a curved portion of 45° to about 90° so as to enable at least a gravity flow of liquid from a compartment selected from the first liquid containing compartment and the second liquid containing compartment of the reservoir towards the outlet pipe (10) when the knife valve (KV) is in its fully open position;

whereby the knife valve (KV) actuated by the actuating mechanism is adapted to move from a fully closed position in which the knife valve closes the outlet opening of the first channel and the outlet opening of the second channel of the duct, up to a fully open position in which the said outlet opening of the first channel and the said outlet opening of the second channel of the duct are not closed by the knife valve (KV), with at least one intermediate position for which at least one of the outlet opening of the first channel and the outlet opening of the second channel is not closed by the knife valve, while at least one of the outlet opening of the first channel and the outlet opening of the second channel is closed by the knife valve (KV);

in which the first and second channels of the duct are provided adjacent to their outlet opening with a honeycomb structure adapted for generating a laminar flow for the liquid flowing through said outlet opening when not closed by the knife valve.

The method can have one or more of the following characteristics:

the reservoir of the device comprises a plurality of distinct and separate liquid containing compartments each provided with a distinct outlet opening;

the knife valve (KV) is movable between a fully closed position in which liquid from the plurality of distinct and separate liquid containing compartments is prevented from flowing within the outlet pipe (10) through the inlet passage, and a fully open position in which liquid from plurality of distinct and separate liquid containing compartments can flow within the outlet pipe (10) through the inlet passage;

the duct (30) comprises a plurality of channels, each channel of the said plurality of channels extending between the outlet opening of a compartment of the plurality of distinct and separate liquid containing compartments and an outlet of the said each channel adjacent to the inlet passage of the outlet pipe (10), said duct comprising a curved portion of 45° to about 90° so as to enable at least a gravity flow of liquid from the plurality of compartments of the reservoir towards the outlet pipe (10) when the knife valve (KV) is in its fully open position;

the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with at least one intermediate position for which at least one of the outlet openings of the plurality of channels is not closed by the knife valve, while at least one other of the outlet openings of the plurality of channels is closed by the knife valve (KV);

the plurality of channels of the duct are each provided adjacent to their outlet opening with a honeycomb structure adapted for generating a laminar flow for the liquid flowing through said outlet opening when not closed by the knife valve.

the knife valve (KV) is actuated by the actuating mechanism adapted to move from a fully closed position in which the knife valve closes the outlet opening of each of the plurality of channels, up to a fully open position in which the said outlet opening of each of the plurality of channels is not closed by the knife valve (KV), with at least one intermediate position for which at least two of the outlet openings of the plurality of channels are not closed by the knife valve, while at least one other of the outlet openings of the plurality of channels is closed by the knife valve (KV).

the knife valve (KV) is actuated by the actuating mechanism adapted to move from a fully closed position in which the knife valve closes the outlet opening of each of the plurality of channels, up to a fully open position in which the said outlet opening of each of the plurality of channels is not closed by the knife valve (KV), with a plurality of intermediate positions for which at least two of the outlet openings of the plurality of channels are not closed by the knife valve, while at least one other of the outlet openings of the plurality of channels is closed by the knife valve (KV).

the first and second channels are provided adjacent to their outlet opening with a honeycomb structure adapted for generating a laminar flow for the liquid flowing from a channel through said outlet opening when not closed by the knife valve, said honeycomb structure being distant from said outlet opening by a distance of at least 0.5 cm.

at least one additive is added to at least one of the first and second compartments of the reservoir by controlling a dosing system.

the duct of the device has a substantial linear portion adjacent to the outlet opening of the first channel and to the outlet opening of the second channel, said linear portion having a length of at least 20 cm, whereby a honeycomb structure extends at least in the said linear portion on a length of at least 20 cm within each of the said first channel and second channel.

air is admitted in the device adjacent to the knife valve, via an air admittance valve.

a blockage in the drain element is detected by a detecting device emitting a signal to an actuating means controlling the valve control mechanism.

the blockage in the drain element is detected by a sonar detecting device.

in case after treating the drain element with a predetermined series of successive distinct water waves, a problem in the treated drain element is still detected, an alarm signal is emitted.

Combinations thereof.

A method for cleaning a drain element selected from the group including drain pipe and discharge pipes connected thereto, drain pipe or a pipe connected thereto in order to break down or reduce at least one blockage present in the drain element, said method comprising the steps of:

detecting a problem relating to a blockage in the drain element, sending at least water in the drain element in the form of at least two successive distinct waves of water, each of said waves having a volume of less than 1 litre;

detecting whether the problem relating to a blockage is solved or reduced, and in case the problem relating to a blockage is not solved or sufficiently reduced, repeating the step of sending water in the drain element in the form of at least two successive distinct waves of water, each of said waves having a volume of less than 1 litre, the step of sending at least water in the drain element in the form of at least two successive distinct water waves, is operated by a device comprising at least:

a reservoir comprising a plurality of distinct and separate liquid containing compartments each provided with a distinct outlet opening, the said reservoir having at least one connecting part adapted for connecting it to a liquid supply for the filling of said plurality of compartments, whereby said plurality of liquid containing compartments are each provided with a distinct outlet opening;

an outlet pipe (10) having an inlet passage and an outlet passage adapted to be connected to the drain element to be cleaned, said outlet pipe being adapted to be located at a level below the reservoir when the device is connected to a drain element via the outlet pipe (10);

a knife valve (KV) associated with said outlet pipe (10) adjacent to the inlet passage, said knife valve (KV) being movable between a fully closed position in which liquid from the plurality of distinct and separate liquid containing compartments is prevented from flowing within the outlet pipe (10) through the inlet passage, and a fully open position in which liquid from the plurality of distinct and separate liquid containing compartments can flow within the outlet pipe (10) through the inlet passage;

an actuating mechanism (8) for the knife valve so as to move it between the fully closed position and the fully open position;

a duct (30) extending between the reservoir and the outlet pipe (10), said duct comprising a plurality of channels, each channel of the said plurality of channels extending between the outlet opening of a compartment of the plurality of distinct and separate liquid containing compartments and an outlet of the said each channel adjacent to the inlet passage of the outlet pipe (10), said duct comprising a curved portion of 45° to about 90° so as to enable at least a gravity flow of liquid from the plurality of compartments of the reservoir towards the outlet pipe (10) when the knife valve (KV) is in its fully open position;

whereby the knife valve (KV) actuated by the actuating mechanism is adapted to move from a fully closed position in which the knife valve closes the outlet opening of each of the plurality of channels, up to a fully open position in which the said outlet opening of each of the plurality of channels is not closed by the knife valve (KV), with at least one intermediate position for which at least one of the outlet openings of the plurality of channels is not closed by the knife valve, while at least one other of the outlet openings of the plurality of channels is closed by the knife valve (KV);

in which the plurality of channels of the duct are each provided adjacent to their outlet opening with a honeycomb structure adapted for generating a laminar flow for the liquid flowing through said outlet opening when not closed by the knife valve.

Said method can comprise one or more of the following characteristics:

the knife valve (KV) is actuated by the actuating mechanism adapted to move from a fully closed position in which the knife valve closes the outlet opening of each of the plurality of channels, up to a fully open position in which the said outlet opening of each of the plurality of channels is not closed by the knife valve (KV), with at least a plurality of intermediate positions for which at least two of the outlet openings of the plurality of channels are not closed by the knife valve, while at least one other of the outlet openings of the plurality of channels is closed by the knife valve (KV).

at least several channels of the plurality of channels of the device are provided adjacent to their outlet opening with a honeycomb structure adapted for generating a laminar flow for the water flowing through said outlet opening when not closed by the knife valve, said honeycomb structure being adjacent to said outlet opening of the channel considered distant from said outlet opening by a distance of at least 0.5 cm, or of at least 1 cm, such as from 1 to 5 cm.

in case after treating the drain element with a predetermined series of successive distinct water waves, a problem in the treated drain element is still detected, an alarm signal is emitted.

Combinations thereof.

The invention claimed is:

1. A device adapted to be connected to a drain element selected from the group including a drain pipe and discharge pipes connected thereto, for cleaning said drain element by breaking down or reducing at least partly one blockage present in said drain element by generating at least two successive waves of liquid escaping from the device according to a laminar flow into said drain element, said device comprising:
- a reservoir comprising a plurality of distinct and separate liquid containing compartments each provided with a distinct outlet, said reservoir having at least one connecting part adapted for connection to a liquid supply for the filling of said plurality of distinct and separate liquid containing compartments;
- an outlet pipe having an inlet passage and an outlet passage adapted to be connected to the drain element to be cleaned, said outlet pipe being adapted to be located at a level below the reservoir when the device is connected to a drain element via the outlet pipe;
- a duct extending between the distinct and separate liquid containing compartments of the reservoir and the inlet passage of the outlet pipe, said duct comprising a plurality of independent channels, each independent channel being connected to a different one of the distinct outlets and extending from said different one of the distinct and terminating in an outlet opening adjacent to the inlet passage of the outlet pipe;
- a knife valve associated with said outlet pipe adjacent to the inlet passage of the outlet pipe, said knife valve being movable between a fully closed position in which the knife valve closes the outlet opening of each of the plurality of independent channels, whereby liquid from each of the plurality of independent channels is prevented from flowing through the inlet passage of the outlet pipe, and a fully open position in which the outlet opening of each of the plurality of independent channels is not closed by the knife valve, whereby liquid from each of the plurality of independent channels can flow through the inlet passage of the outlet pipe;
- an actuating mechanism for the knife valve operable to move the knife valve between the fully closed position and the fully open position;
- wherein said duct comprises a curved portion of 450 to 900 so as to enable at least a gravity flow of liquid from the plurality of distinct and separate liquid containing compartments of the reservoir towards the outlet pipe through the inlet passage of the outlet pipe when the knife valve is in the fully open position;
- whereby the knife valve actuated by the actuating mechanism is adapted to move from the fully closed position up to the fully open position, with at least one intermediate position for which at least one of the outlet openings of the plurality of independent channels is not closed by the knife valve, while at least one other of the outlet openings of the plurality of independent channels is closed by the knife valve; and
- wherein the plurality of independent channels of the duct are each provided adjacent to their outlet opening with a honeycomb structure adapted for generating a laminar flow for the liquid flowing through said outlet opening when not closed by the knife valve.

2. The device of claim 1, wherein the knife valve has a plurality of intermediate positions for which at least two of the outlet openings of the plurality of independent channels of the duct are not closed by the knife valve, while at least one other of the outlet openings of the plurality of independent channels of the duct is closed by the knife valve.

3. The device of claim 1, wherein for two or more of the independent channels of the plurality of the independent channels of the duct, said honeycomb structure is spaced apart from said outlet opening by a distance of at least 0.5 cm.

4. The device of claim 3, wherein said honeycomb structure is spaced apart from said outlet opening by a distance of at least 1 cm.

5. The device of claim 3, wherein said honeycomb structure is spaced apart from said outlet opening by a distance from 1 to 5 cm.

6. The device of claim 1, wherein at least several of the distinct and separate liquid containing compartments of the reservoir comprise a dosing system for adding one additive to the liquid present in the at least several of the distinct and separate liquid containing compartments.

7. The device of claim 1, further comprising an air admittance valve.

8. The device of claim 7, wherein the air admittance valve is adjacent to the knife valve.

9. The device of claim 1, wherein the plurality of independent channels of the duct comprises at least four distinct channels separated from one another by three inner curved walls.

10. The device of claim 9, wherein the duct has a circular cross section, while the wall separating two adjacent independent channels of said duct has a radius of curvature at least equal to the radius of the circular cross section of the duct.

11. The device of claim 1, wherein the outlet pipe is adapted for connection with an air admittance valve.

* * * * *